(12) United States Patent
Te et al.

(10) Patent No.: US 7,346,915 B2
(45) Date of Patent: Mar. 18, 2008

(54) COMPACT AND PORTABLE OPTICAL DISC DRIVE

(75) Inventors: Bun Chay Te, Corvallis, OR (US); Charles R. Weirauch, Loveland, CO (US); Joseph W. Dody, Corvallis, OR (US); Summer Schneider, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 355 days.

(21) Appl. No.: 11/222,645

(22) Filed: Sep. 9, 2005

(65) Prior Publication Data

US 2007/0061825 A1    Mar. 15, 2007

(51) Int. Cl.
*G11B 7/085* (2006.01)
*G11B 7/08* (2006.01)
*G11B 7/09* (2006.01)
*G06F 1/16* (2006.01)

(52) U.S. Cl. ............... 720/664; 361/683; 361/685
(58) Field of Classification Search ........... 720/664; 361/683, 685
See application file for complete search history.

(56) References Cited

U.S. PATENT DOCUMENTS

| | | | |
|---|---|---|---|
| 4,152,728 A | | 5/1979 | Camerik |
| 5,712,763 A | * | 1/1998 | Bullister .............. 361/686 |
| 5,724,274 A | * | 3/1998 | Nelson et al. ............ 361/683 |
| 5,739,995 A | * | 4/1998 | Ohmi et al. ............. 360/137 |
| 6,208,506 B1 | | 3/2001 | Pao |
| 6,370,099 B1 | | 4/2002 | Crigler |
| 6,477,128 B1 | | 11/2002 | Ma |
| 6,961,238 B2 | * | 11/2005 | Aketagawa et al. ....... 361/685 |
| 7,154,756 B2 | * | 12/2006 | Ito ........................ 361/724 |
| 7,236,432 B2 | * | 6/2007 | Shen ...................... 369/39.01 |
| 2003/0179682 A1 | | 9/2003 | Osada |
| 2004/0208089 A1 | | 10/2004 | Shen |
| 2005/0185375 A1 | * | 8/2005 | Ito ......................... 361/685 |
| 2005/0226606 A1 | * | 10/2005 | Kikuchi .................. 386/125 |
| 2006/0002069 A1 | * | 1/2006 | Chuang .................. 361/683 |

FOREIGN PATENT DOCUMENTS

| | | |
|---|---|---|
| JP | 62 209790 | 9/1987 |
| JP | 2004 178766 | 6/2004 |
| WO | WO 98/32091 | 7/1998 |

* cited by examiner

*Primary Examiner*—Angel Castro
*Assistant Examiner*—Christopher R. Magee

(57) ABSTRACT

Various embodiments of the present invention are directed to a compact, portable, external optical disc drives. In one embodiment of the present invention, an optical disc drive is comprised of one or more substrates having a width smaller than the diameter of an optical disc and that covers and protects one or more data recording surfaces of the optical disc. The optical disc drive may also include an external connector that is capable of plugging into an outlet of an electrical device so that the optical disc drive extends beyond an external sidewall of the electrical device and is electronically interconnected to the electrical device.

30 Claims, 17 Drawing Sheets

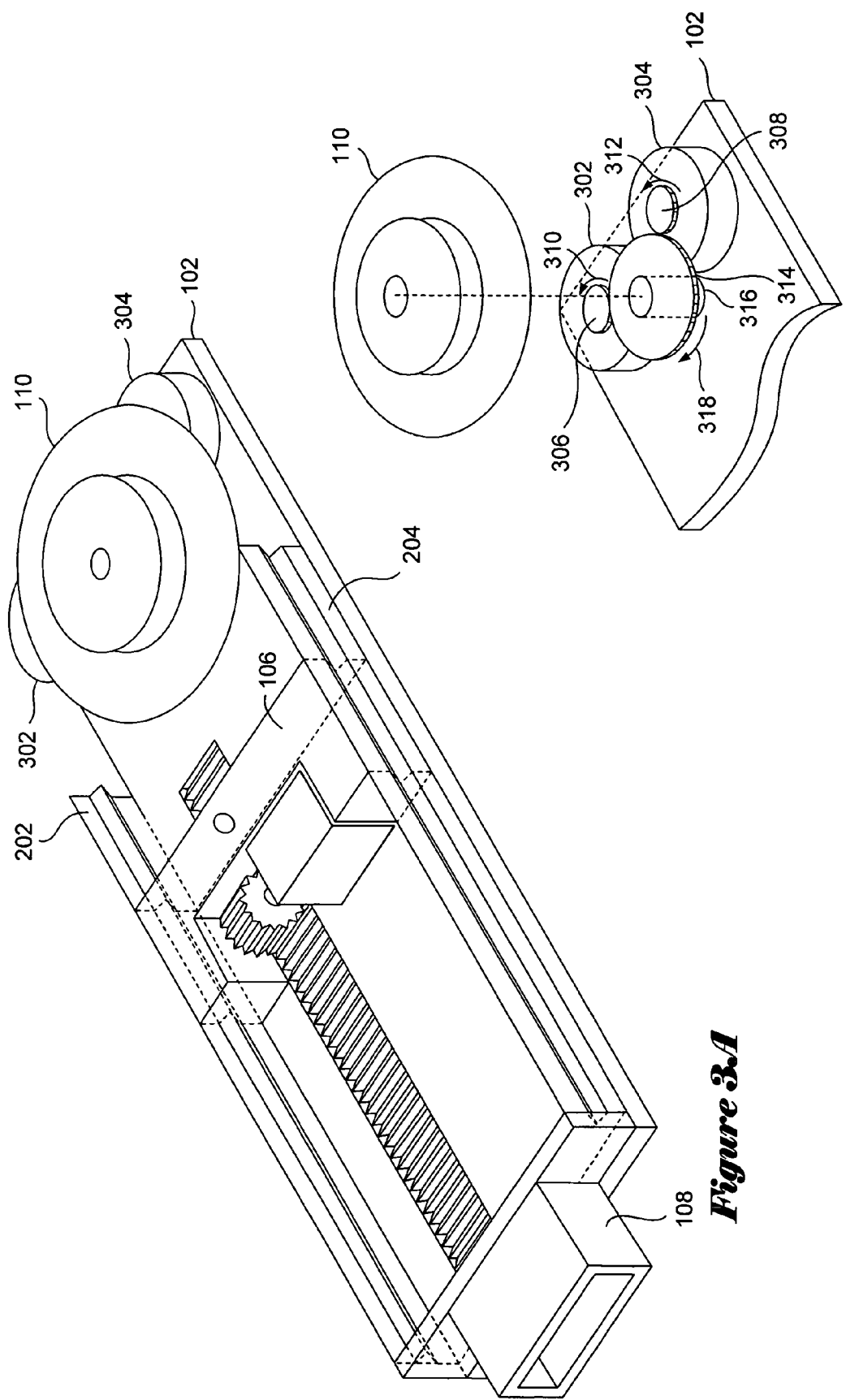

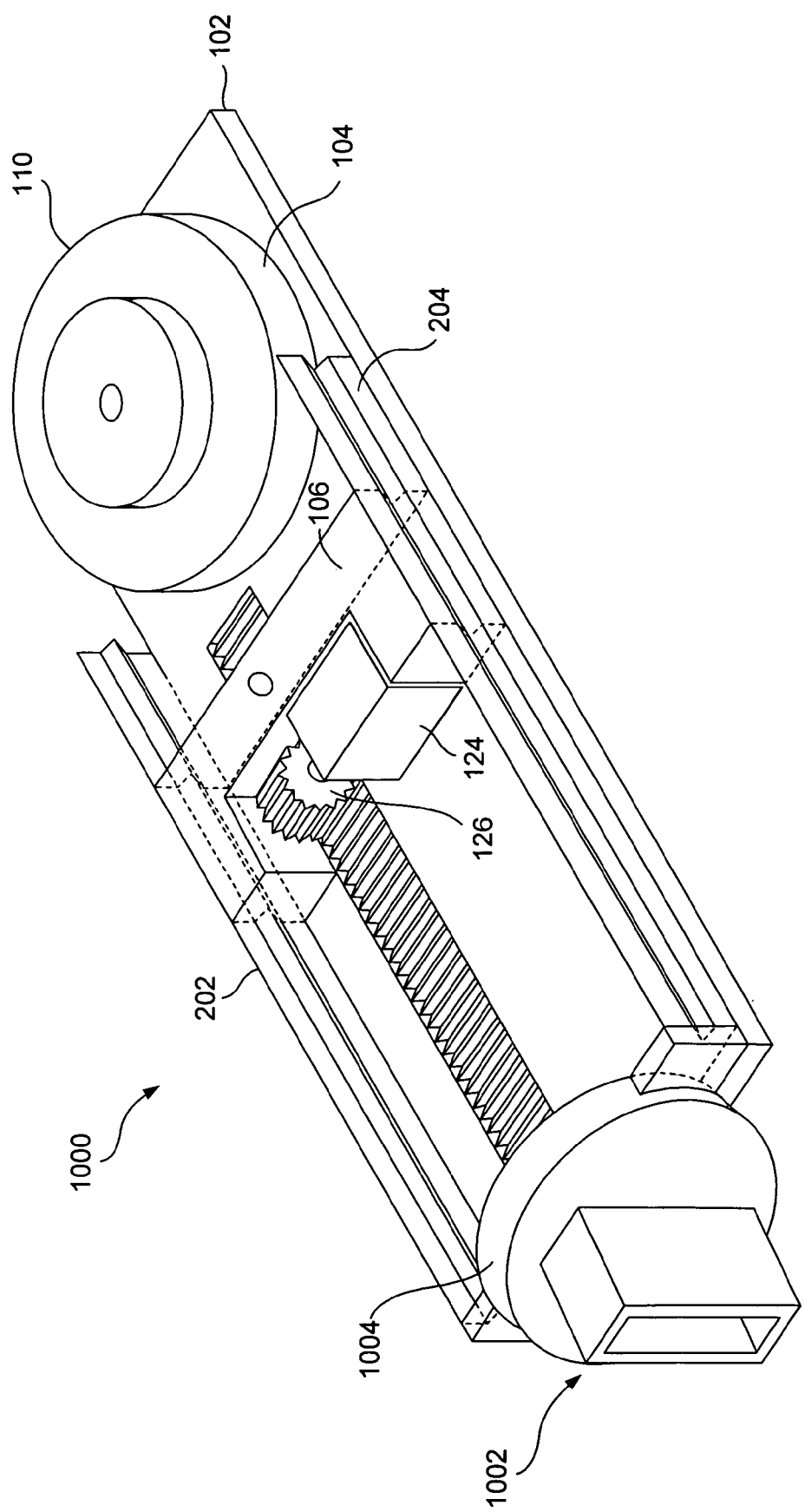

COMPACT AND PORTABLE OPTICAL DISC DRIVE

TECHNICAL FIELD

The present invention relates to optical disk drives, and, in particular, to compact, portable optical disc drives that can be externally connected to electronic devices.

BACKGROUND OF THE INVENTION

In recent years, the electronics and computing industries have continued to reduce the size of electronic components, which, in turn, has lead to the development of small electronic devices. For example, notebook computers are small portable microcomputers about the size of an ordinary loose-leaf binder, personal digital assistants ("PDAs") are small electronic devices that combine computing, telephone/fax, and networking and that are about the size of an adult human hand, and digital cameras are small electronic devices that provide electronic storage and retrieval of numerous photographs. Because small electronic devices are light weight and take up less space than larger, functionally equivalent electronic devices, small electronic devices are often more convenient to store and transport.

Small electronic devices often include components for retrieving and storing data, such as various types of electronic memory. However, small electronic devices do not typically include a means for retrieving data from, or storing large amounts of data to, removable mass storage media. For example, small electronic devices may not include an optical disc drive for retrieving data from, and storing data on, optical discs because optical disc drives may be too large to incorporate within the small electronic device.

Optical disc drives access data-storage regions of an optical disc using a laser beam. An optical disc is a flat, circular disc with one or more reflective surfaces, referred to as "data recording surfaces." Data is stored on an optical disc by changing the reflectivity of tiny, bit-storing regions on a data recording surface of the optical disc.

Small electronic devices can be connected to external optical disc drives using an external connector, such as a universal serial bus ("USB"). External optical disc drives are typically larger than optical discs. Optical disc drives include a tray for receiving an optical disc, and the optical disc is normally fully enclosed within a housing when in use. Typical, external optical discs are attached to a clamping mechanism that serves as a turntable and is rotated by a spindle motor in order to allow an optical assembly to accesses data-storage regions of the optical disc. The optical assembly includes a light source for illuminating data-storage regions during read access, the data read by a photodetector responsive to the differences in reflectivity that encode binary values "0" and "1." The laser light source may also be used to write data to the optical disc.

Optical disc drives are a convenient and standard reusable mass storage medium, desired by many users of electronic consumer devices for accessing and transferring information. Therefore, designers, manufacturers, and users of small electronic devices have recognized a need for external optical disc drives that weigh less and need less storage space than typical external optical disc drives.

SUMMARY OF THE INVENTION

Various embodiments of the present invention are directed to a compact, portable, external optical disc drives. In one embodiment of the present invention, an optical disc drive is comprised of one or more substrates having a width smaller than the diameter of an optical disc and that covers and protects one or more data recording surfaces of the optical disc. The optical disc drive may also include an external connector that is capable of plugging into an outlet of an electrical device so that the optical disc drive extends beyond an external sidewall of the electrical device and is electronically interconnected to the electrical device.

BRIEF DESCRIPTION OF THE DRAWINGS

FIGS. 2A-2D illustrate a perspective view of a compact, portable optical disc drive with slotted guides that represents one of many embodiments of the present invention.

FIGS. 3A-3B illustrate an optical disc drive that uses two separate motors to operate a clamping mechanism and that represents one of many embodiments of the present invention.

FIGS. 10A-10B illustrate an optical disc drive that includes an external connector that can be rotated within a plane perpendicular to the plane of the optical disc drive that represents one of many embodiments of the present invention.

DETAILED DESCRIPTION OF THE INVENTION

Various embodiments of the present invention are directed to compact, portable, external optical disc drives that can be used to write data to, and read data stored, on an optical disc and that can be externally connected to electronic devices, such as computers, PDAs, and digital cameras.

Figure 1:
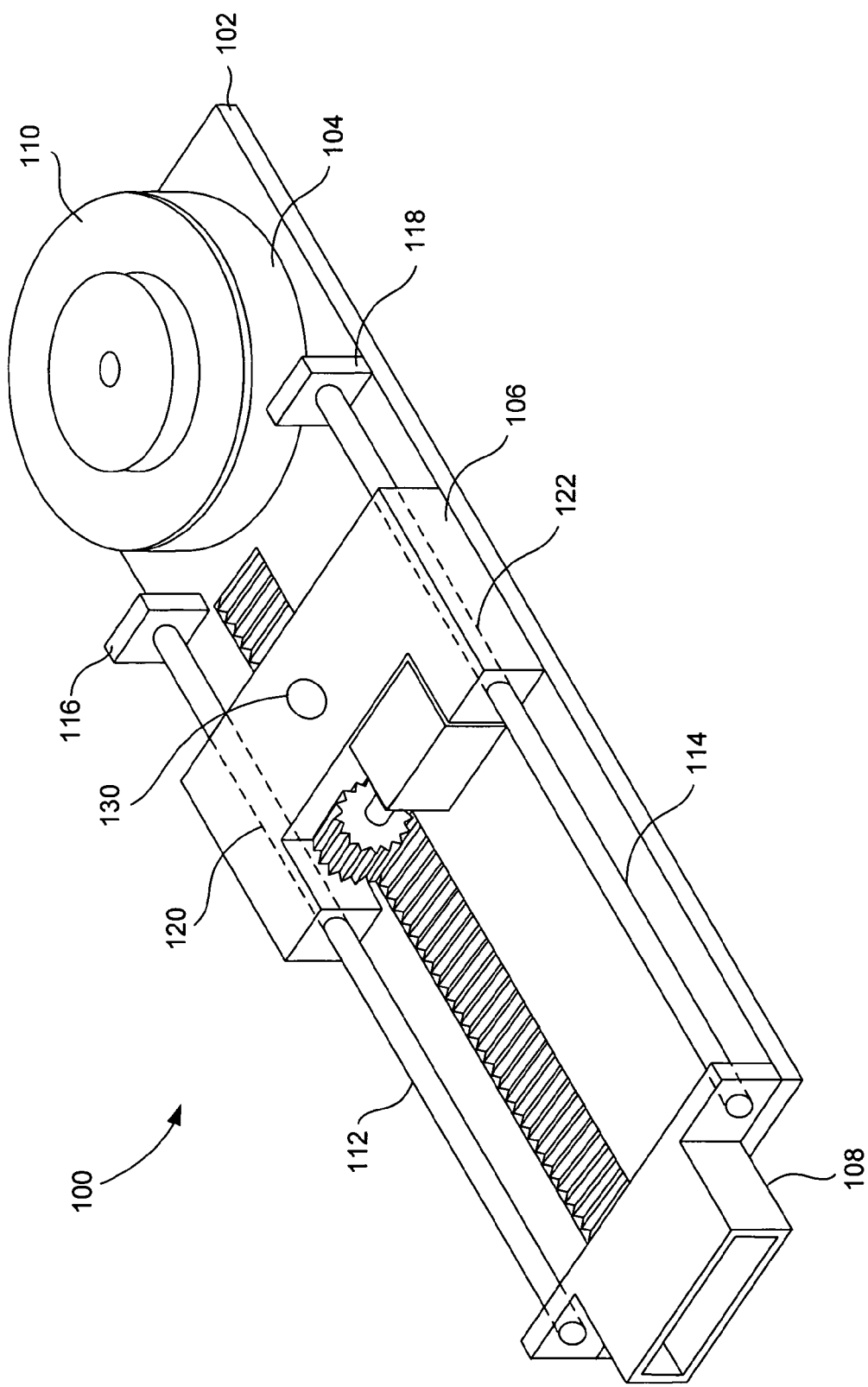
FIG. 1 illustrates a perspective view of a compact, portable optical disc drive with cylindrical guides that represents one of many embodiments of the present invention.

FIG. 1 illustrates a perspective view of a compact, portable optical disc drive with cylindrical guides that represents one of many embodiments of the present invention. In FIG. 1, optical disc drive 100 includes a substrate 102 that provides support for a spindle motor 104, an optical assembly 106, and an external connector 108. The external connector can be a USB, an IEEE 1394, or any other connection that permits the transmission of power from, and data to and from, an external device. The substrate 102 can include electrical interconnections that interconnect the external connector 108, the optical assembly 106, and the spindle motor 104. The width of the substrate 102 is smaller than the diameter of an optical disc. The spindle motor 104 includes a spindle (not shown) that is connected to clamping mechanism 110. An optical disc is mounted on the clamping mechanism 110, and the clamping mechanism 110 and the optical disc are rotated together by the spindle motor 104. An optical disc may be attached to the clamping mechanism by pressing the central aperture of the optical disc onto a hub of the clamping mechanism 110. In addition to providing support for the optical disc drive 100 components, the substrate 102 may protect a portion of the data recording surface of the optical disc. The optical disc drive 100 also includes parallel cylindrical guides 112 and 114 that are attached to supports 116 and 118, respectively, and to the external connector 108.

The optical assembly 106 includes guide holes 120 and 122 that accommodate the cylindrical guides 112 and 114, and is attached to optical drive motor 124. The optical drive motor 124 is connected to a gear 126. The teeth of the gear 126 interlock with the teeth of a stationary rack 128 that is located on the substrate 102. The optical drive motor 124 can rotate the gear 126 in both clockwise and counterclockwise directions. Because the teeth of the rack 128 and the teeth of the gear 126 are interlocked, a clockwise or counterclockwise rotational force provided by the optical drive motor 124 is converted into linear force that moves the optical assembly 106 forward or backward in a linear direction parallel to the rack 128. The linear forward and backward movement of the optical assembly 106 coincides with the radial direction of an optical disc placed on the clamping mechanism 110 and is maintained by the cylindrical guides 112 and 114. The length of the rack 128 is designed to cover the distance between the inner and outer radius of the data recording surface of an optical disc placed on the clamping mechanism 110. In an alternate embodiment of the present invention, a worm gear can be used to convert the clockwise or counterclockwise rotational force provided by the optical drive motor 124 into linear force that moves the optical assembly 106 forward and backward.

An optical disc is placed on the clamping mechanism 110 so that a data recording surface of the optical disc faces the optical assembly 106. The optical assembly 106 includes a first laser light source (not shown), a photodetector (not shown), and an objective lens 130. The laser light source generates a laser beam that is transmitted through the objective lens 130. The laser beam travels from the optical assembly 106 in the direction of the optical axis of the objective lens 130 striking the data recording surface of the optical disc supported by the clamping mechanism 110. Light reflected off of the data recording surface of the optical disc is detected by the photodetector. Data can be recorded in the form of pits or marks (recording spots) and spaces (absence of a pit or a recording mark) in the data recording surface. For example, a pit or a mark may correspond to the logic value "1," and a space may correspond to a logic value "0." As a result, the pits, or recording marks, and spaces in the data recording surface cause corresponding variations in the intensity of the light detected by the photodetector The variations in the light detected by the photodetector are transformed by the optical assembly 106 into digital electrical signals. The optical assembly 106 may also include a second laser light source or use the first laser light source at a higher power to write data to the data recording surface of an optical disc placed on the clamping mechanism 110.

Figure 2A:
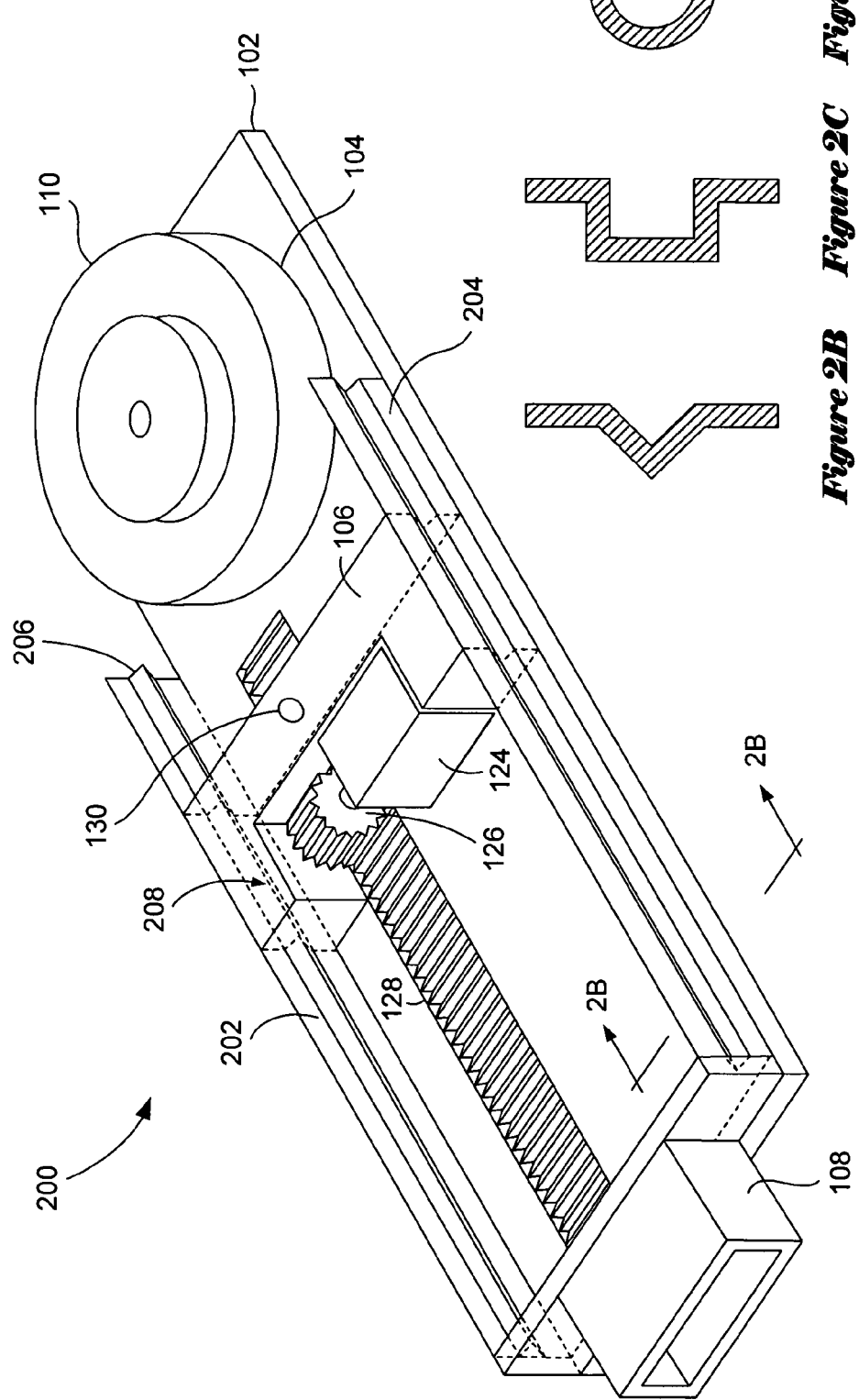

In an alternate embodiment of the present invention, the cylindrical guides 112 and 114 can be replaced with slotted guides. FIGS. 2A-2D illustrate a perspective view of a compact, portable optical disc drive with slotted guides that represents one of many embodiments of the present invention. In FIG. 2, slotted guides 202 and 204 are attached to the substrate 102 and to the external connector 108. The slotted guides 202 and 204 can be composed of long, narrow thin metal or plastic sheets, each including a slot that extends the length of each sheet and is indented toward the inside of optical disc drive 200. For example, the slot 206 of the slotted guide 202 is indented inward. The inward indented slots provide guides that maintain the forward and backward linear sliding movement of the optical assembly 106 parallel to the rack 128. The optical assembly 106 includes slots that accommodate the shapes of the indented slots of the slotted guides 202 and 204. For example, the optical assembly 106 also includes an indented slot 208 that accommodates the shape of the inward indented slot 206. The coupling of the slots in the slotted guides 202 and 204 with the slots in the optical assembly 106 prevents optical assembly 106 from falling out of an inverted optical disc drive 200. FIG. 2B illustrates a cross-sectional view of a triangular slotted guide 202 that represents one of many embodiments of the present invention. However, the present invention is not limited to slotted guides with slots having triangular shaped cross-sections. There are numerous different indented slot shapes that can be used in the slotted guides 202 and 204. For example, FIGS. 2C and 2D illustrate cross-sectional views of rectangular and semicircular shaped slots that can be used in the slotted guides 202 and 204, each representing one of many embodiments of the present invention.

In alternate embodiments of the present invention, the gear may be reoriented so that one or more of the guides may also serve as a rack. For example, in an alternate embodiment, the rack 128, shown in FIG. 1, may be incorporated into one of the guides 202 or 204, shown in FIG. 2, or one the cylindrical guides 112 or 114, shown in FIG. 1. In addition, the gear 126 and the optical drive motor 124 are reoriented to move the optical assembly 106 forward and backward.

In an alternate embodiment of the present invention, the spindle motor 104, shown in FIGS. 1 and 2, can be replaced by two or more smaller motors that rotate the clamping mechanism 110. For example, FIGS. 3A-3B illustrate an optical disc drive that uses two separate motors to operate a clamping mechanism that represents one of many embodiments of the present invention. In FIG. 3A, motors 302 and 304 are located beneath clamping mechanism 110. FIG. 3B illustrates employing the motors 302 and 304 to rotate the clamping mechanism 110. The motors 302 and 304 rotate both gears 306 and 308 in the same direction identified by directional arrows 310 and 312, respectively. The gears 306 and 308 include teeth that interlock with the teeth of gear 314. The gear 314 is supported by a spindle 316 above substrate 102 and is connected to the underside of the clamping mechanism 110. The rotation of gears 306 and 308 causes the gear 314 to rotate in the direction identified by directional arrow 318, which is opposite the rotational directions of the gears 306 and 308. The two motors can both initially be turned on in order to overcome the rotational inertia associated with beginning rotation of an optical disc mounted on the clamping mechanism 110, but once the optical disc reaches an appropriate speed of rotation, one of the motors can be turned off and the power diverted to the optical assembly for reading and writing of the optical disc. In alternate embodiments of the present invention, motors 302 and 304 may each provide different torques, and teeth associated with gears 306, 308, and 314 can be replaced with friction wheels, such as solid rubber tires.

Figure 4:
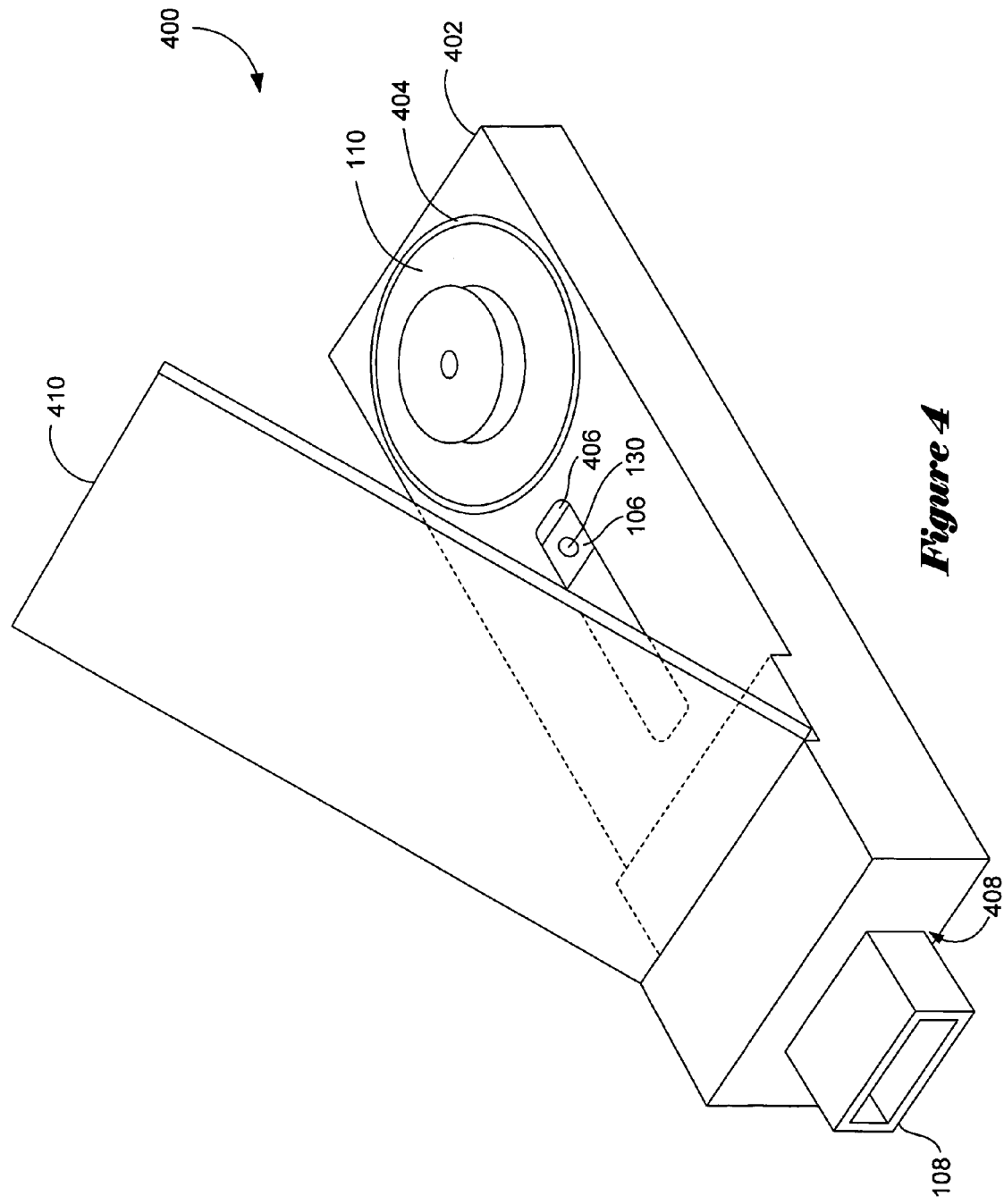
FIG. 4 illustrate a perspective view of a covered optical disc drive that represents one of many embodiments of the present invention.

In an alternate embodiment of the present invention, a cover can be included to protect the components of compact, portable optical disc drive. FIG. 4 illustrates a perspective view of a covered optical disc drive that represents one of many embodiments of the present invention. In FIG. 4, a covered, portable optical disc drive 400 includes a case 402 that covers and protects the optical disc drive components, described above with reference to FIGS. 1-3. The case 402 includes an opening 404 that permits access to the clamping mechanism 110, an opening 406 that permits the optical assembly 106 to transmit a laser beam, and receive reflected light from, the data recording surface of an optical disc mounted on the clamping mechanism 110, and an opening 408 that permits a connection to the external connector 108. The covered optical disc drive 400 may also include a flap 410 that can be closed to cover a portion of an optical disc supported by, and rotating with, the clamping mechanism 110.

Figure 5A:
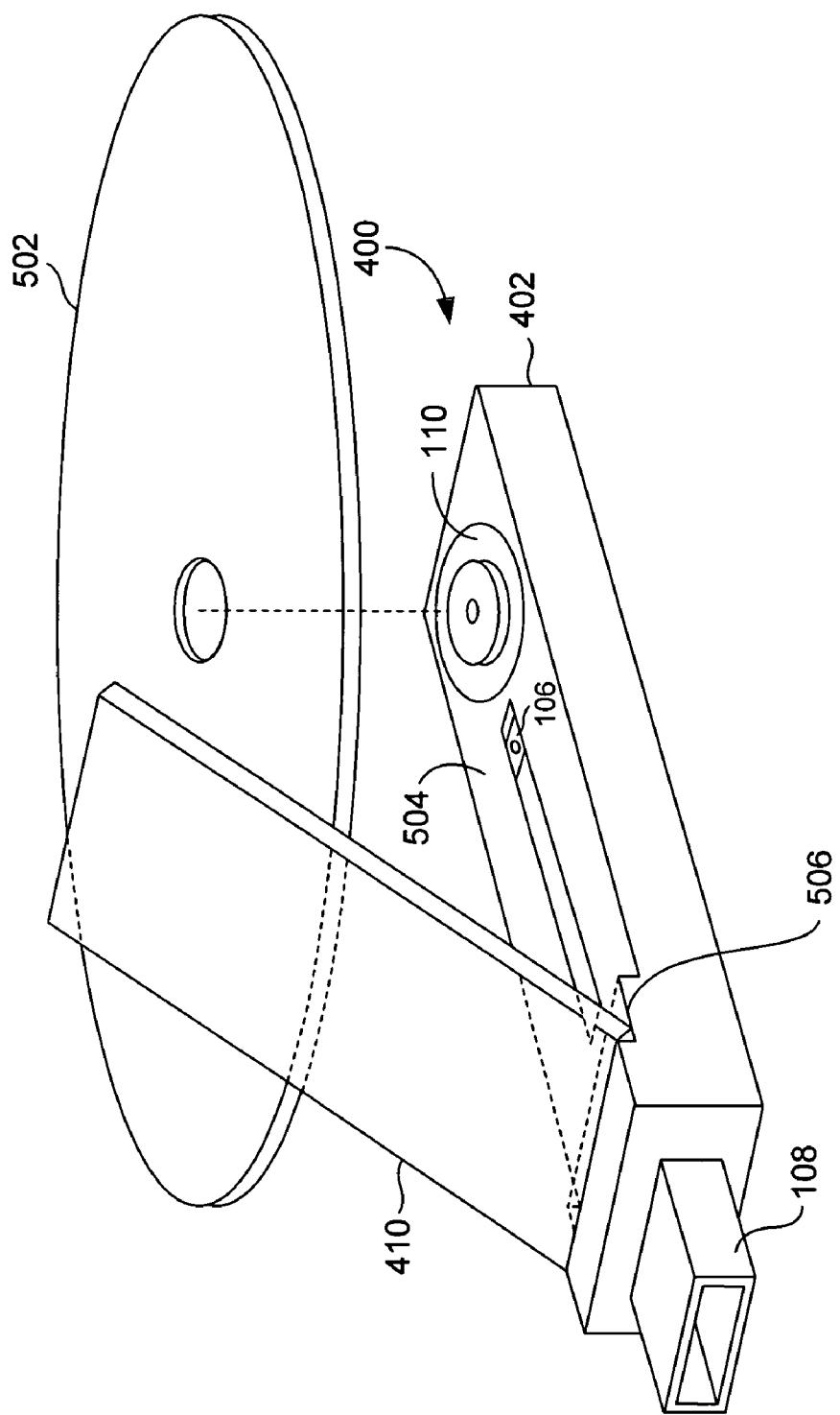
FIGS. 5A-5B illustrate operation of the covered optical disc drive shown in FIG. 4.
Figure 5B:
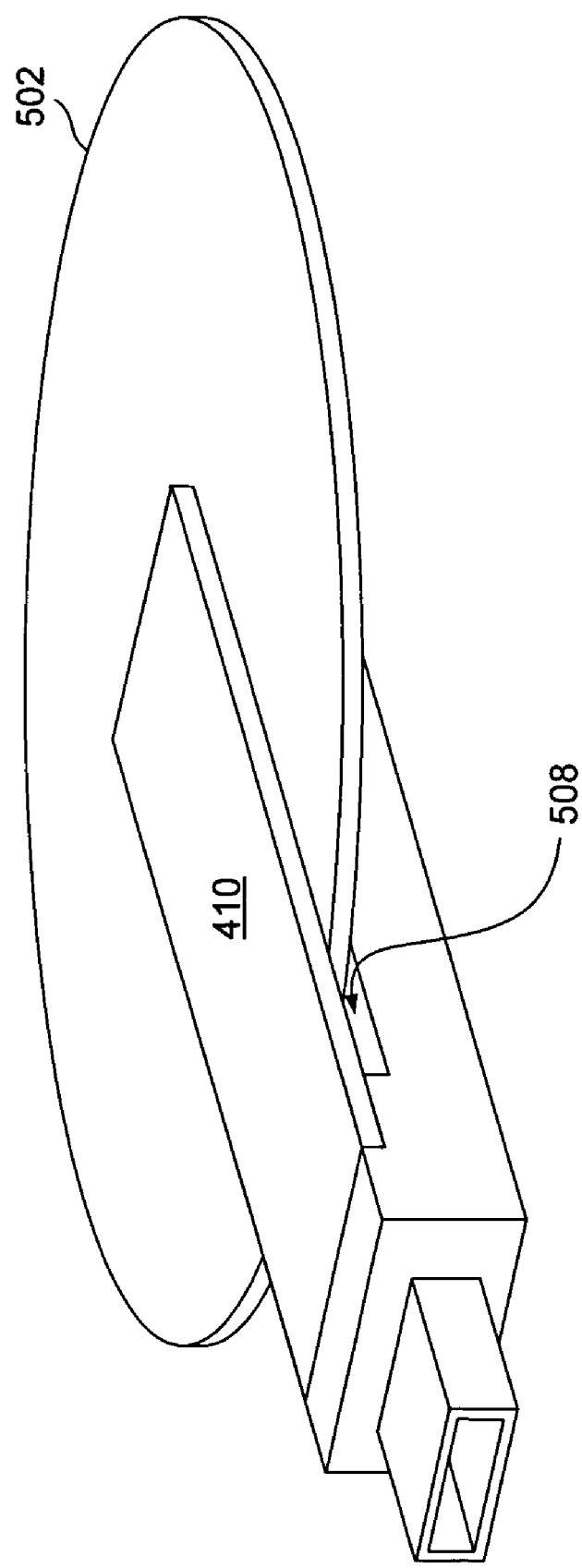

FIGS. 5A-5B illustrate operation of the covered optical disc drive shown in FIG. 4. In FIG. 5A, the flap 410 is open so that an optical disc 502 can be placed on the clamping mechanism 110. The optical disc 502 is positioned so that a data recording surface of the optical disc 502 faces the top surface 504 of the covered optical disc drive 400. The data recording surface can then be read from, or written to, by the optical assembly 106. After the optical disc 502 is placed on the clamping mechanism 110, the flap 410 can be closed. The cover 402 may also include a shelf 506 to prevent closed flap 410 from rubbing against the optical disc 502. In FIG. 5B, the optical disc 502 is placed on the clamping mechanism 110, and the flap 410 is closed. A gap 508 identifies a region between the flap 410 and the top surface 504 that allows the optical disc 502 to freely rotate.

Figure 6A:
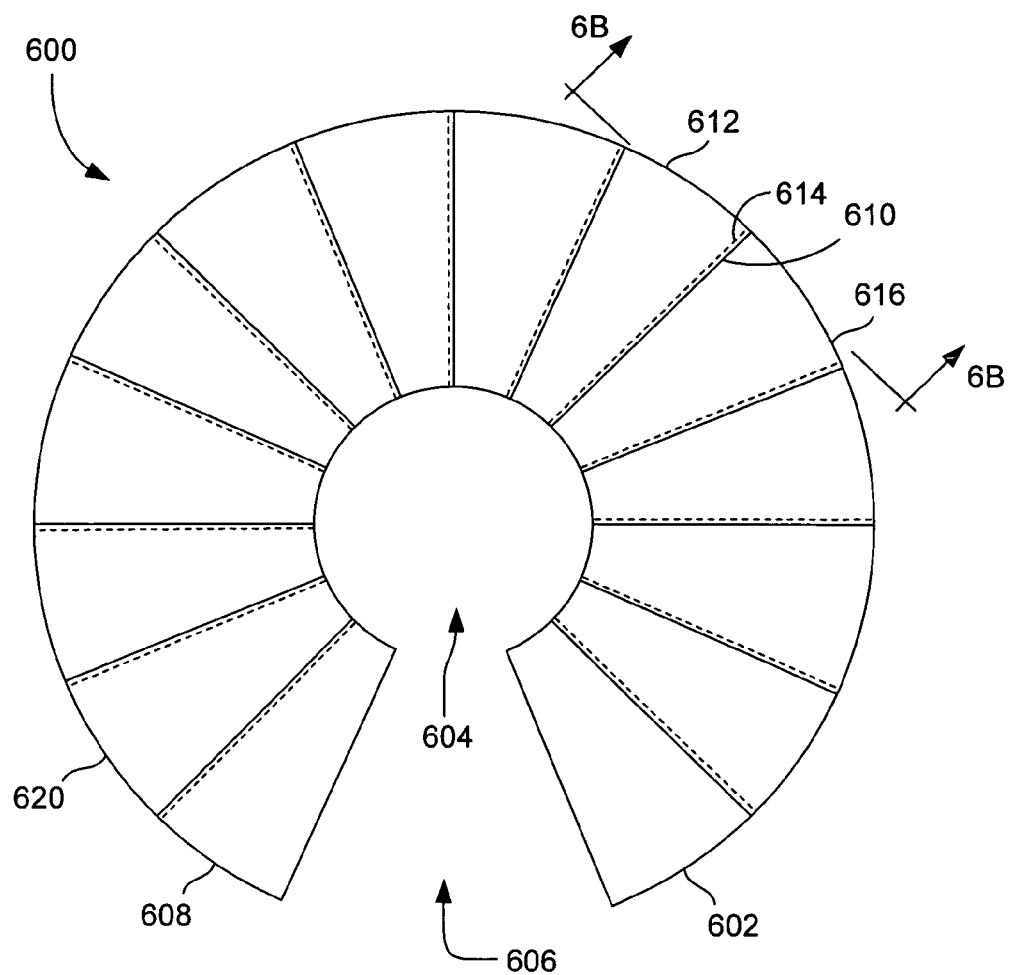
FIGS. 6A-6D illustrate an expandable and retractable optical disc cover that represents one of many embodiments of the present invention.

In alternate embodiments of the present invention, a compact, portable optical disc may include an expandable and retractable optical disc cover that may be used to protect a data recording surface of an optical disc from being scratched or scored during operation. FIGS. 6A-6D illustrate an expandable and retractable optical disc cover, that represents one of many embodiments of the present invention. FIG. 6A illustrates a fully expanded optical disc cover 600 comprising a number of separate vanes, such as vane 602. The vanes can be composed of metal, plastic, paper, wood, or other suitable material. In FIG. 6A, an opening 604 provides access for attaching an optical disc to the clamping mechanism 110, as described above with reference to FIG. 1, and an opening 606 between the vanes 602 and 608 provides access for an optical assembly, such as optical assembly 106, described above with reference to FIG. 1. Use of optical disc cover 600 is described below with reference to FIG. 7. The vanes of the optical disc cover overlap at vane boundaries. For example, a solid line 610 represents the edge of a vane 612 that overlaps the edge of a vane 614 represented by a dashed-line 616.

Figure 6B:
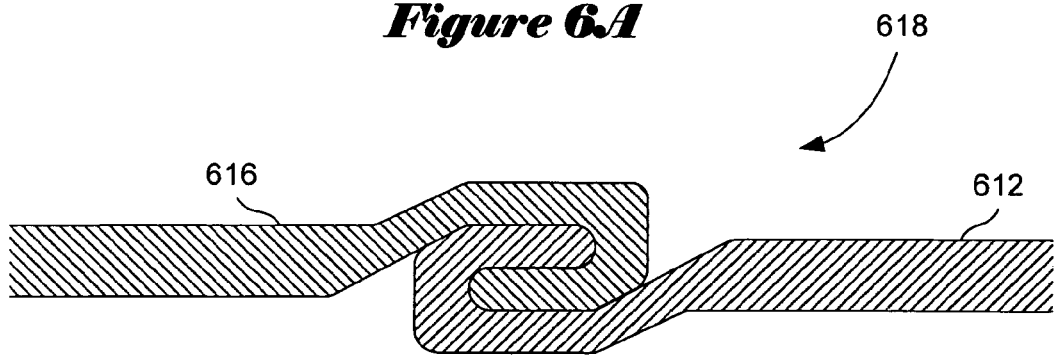

The vanes of expanded optical disc cover 600 can be interconnected via clasps that prevent the vanes from retracting and separating during expansion of the optical disc cover 600. FIG. 6B illustrates a cross-sectional view of a clasp that can be used to connect the vanes shown in FIG. 6A, and that represents one of many embodiments of the present invention. In FIG. 6B, the edge of vanes 612 and 616 have interlocking hooks, or a clasp 618. In alternate embodiments, optical disc cover 600 can be composed of a single piece of material, such as paper, metal, or plastic, that can be folded, creased or hinged along lines, such as line 610, so that the optical disc cover 600 can be folded and unfolded like an accordion.

Figure 6C:
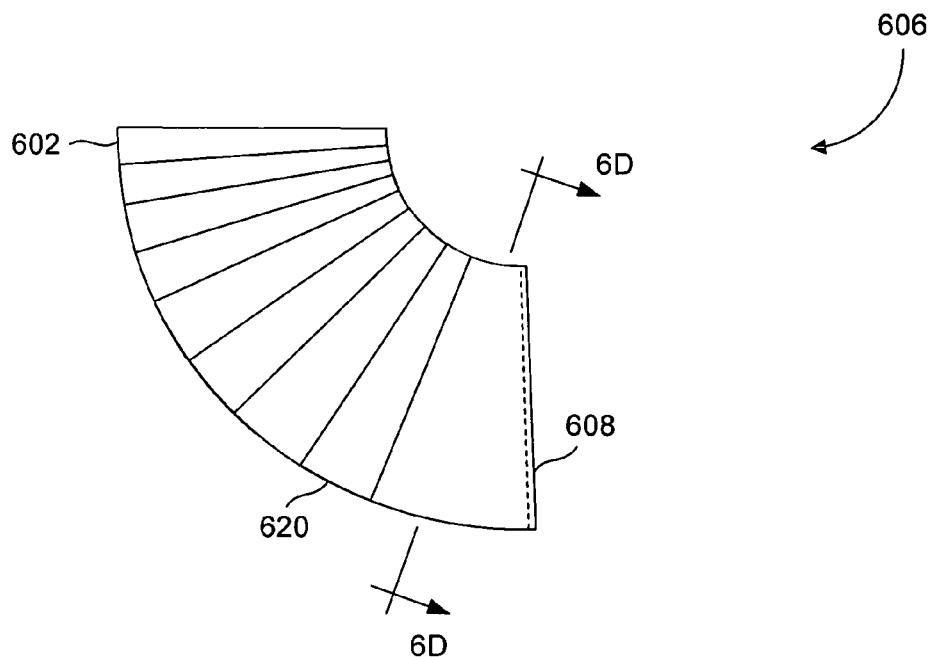
Figure 6D:
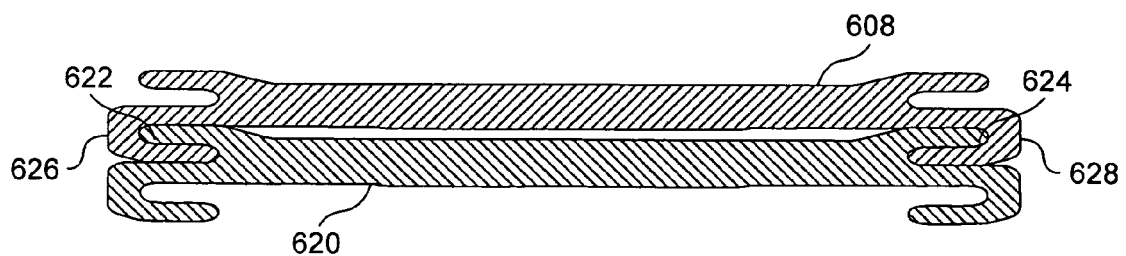

FIG. 6C illustrates partial retraction of the optical disc cover shown in FIG. 6A. In FIG. 6C, the vanes are each located underneath adjacent vanes that overlap along the edges so that the optical disc cover can be retracted by sliding each vane beneath an overlapping vane. For example, in FIG. 6A, vane 608 overlaps an adjacent vane 620, and, in the partially retracted optical disc cover shown in FIG. 6C, vane 620 has been slid beneath vane 608. In order to prevent the vanes from sliding apart while an optical disc cover is retracted, the ends of each vane may include a tongue and groove clasp that represent one of many embodiments of the present invention. FIG. 6D illustrates a cross-sectional view of the partly retracted optical disc cover shown in FIG. 6C. In FIG. 6D, tongue and groove clasps are located at the ends of the vanes 608 and 620. For example, tongues 622 and 624 of the vane 620 fit into grooves 626 and 628, respectively, of vane 608.

Figure 7:
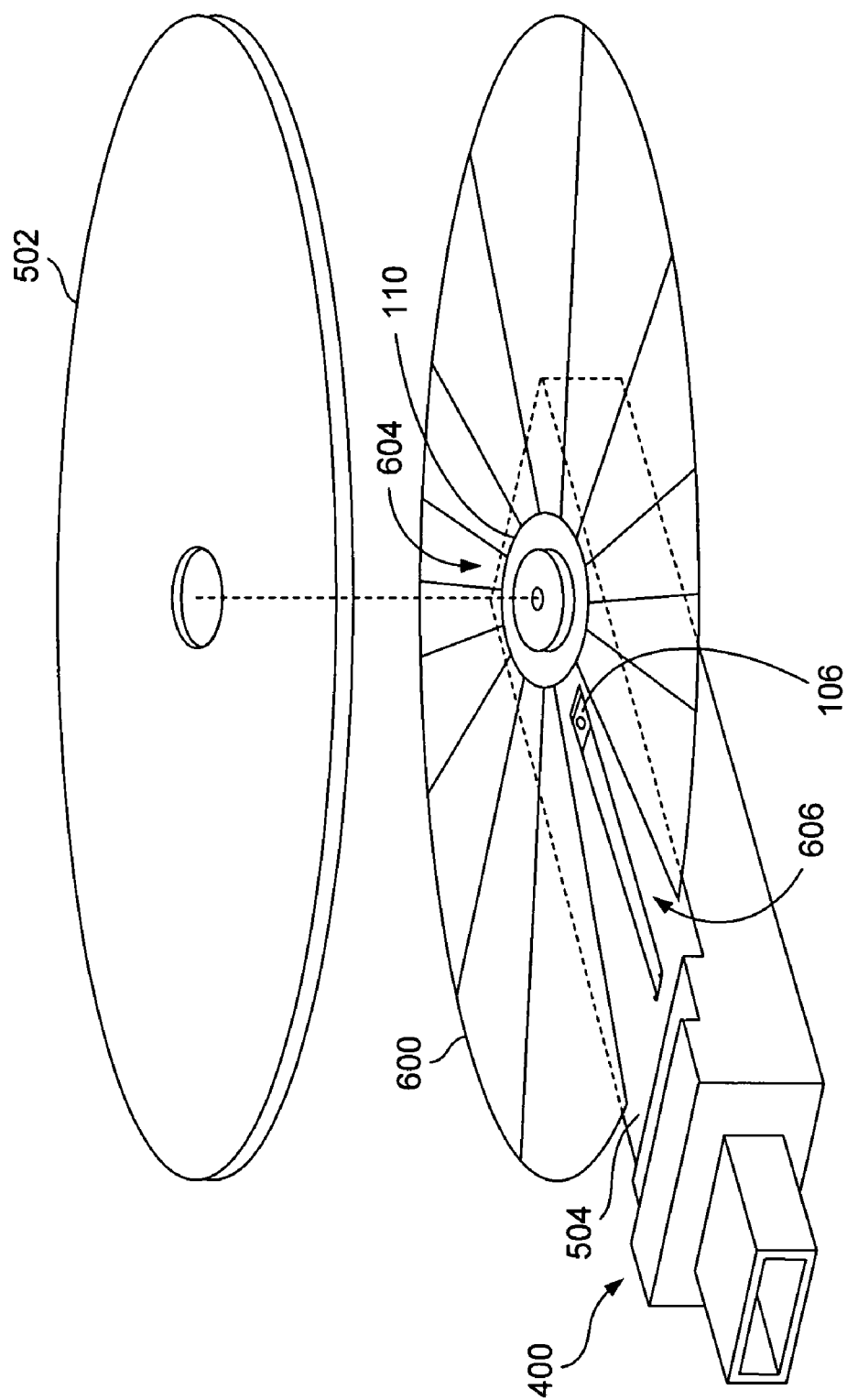
FIG. 7 illustrates implementing the optical disc cover, shown in FIGS. 6A-6D, with the covered optical disc drive, shown in FIG. 4.

FIG. 7 illustrates implementing the optical disc cover, described above with reference to FIGS. 6A-6D, with the covered optical disc drive, described above with reference to FIG. 4. In FIG. 7, the optical disc cover 600 is located on top surface 504 of covered optical disc drive 400. The opening 604 in the optical disc cover 600 provides access to the clamping mechanism 110 so that optical disc 502 can be mounted on clamping mechanism 110. The opening 606 in optical disc cover 600 provides the optical assembly 106 access to a data-recording surface of the optical disc 502. Note that the optical disc cover 600 can be attached to the optical disc drive 400 and that clamping mechanism 110 may extend above the optical disc cover 600 so that the rotating optical disc 502 does not rub against the surface of the optical disc cover 600.

Figure 8A:
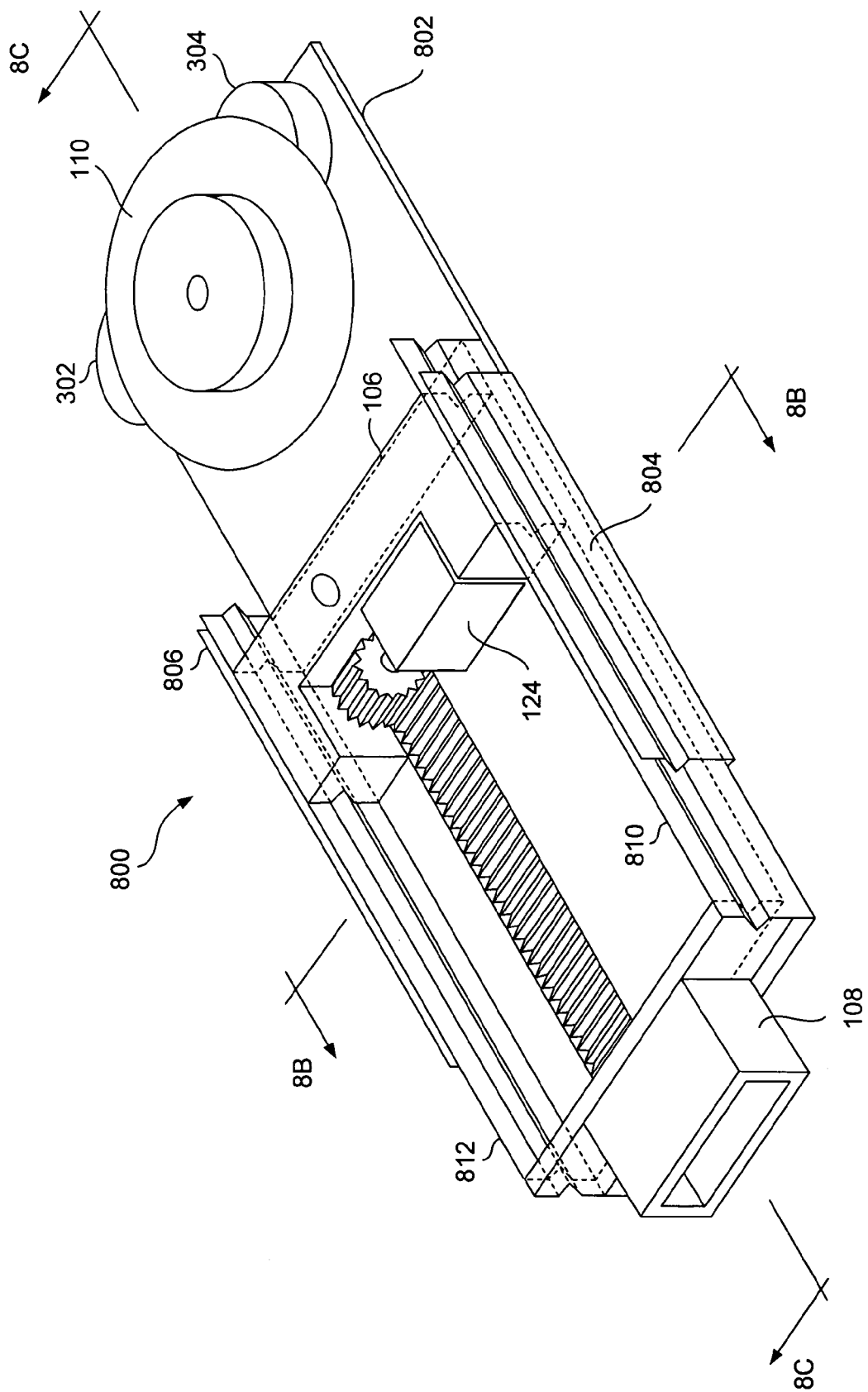
FIGS. 8A-8E illustrate different views of an expandable optical disc drive that represents one of many embodiments of the present invention.

In an alternate embodiment of the present invention, a portable optical disc drive can include an expandable substrate that allows the optical disc drive to be expanded to a larger size when in use and retracted to a smaller size when not in use. FIGS. 8A-8E illustrate different views of an expandable optical disc drive that represents one of many embodiments of the present invention. FIG. 8A illustrates a perspective view of an expanded optical disc drive 800. In FIG. 8A, expanded optical disc drive 800 comprises a first substrate 802 that includes slotted guides 804 and 806, and a second substrate 808 that includes slotted guides 810 and 812. The first substrate 802 provides support for the motors 302 and 304, and the clamping mechanism 110, as described above with reference to FIGS. 3A-3B. The second substrate 808 is located on the top surface of the first substrate 802 and provides support for the optical assembly 106, the drive motor 124, and the external connector 108. The slotted guides 810 and 812 of the second substrate 808 fit within the space between slotted guides 804 and 806 of the first substrate 802. In particular, the indentations of slotted guides 810 and 812 accommodate the indentations of the slotted guides 804 and 806, respectively. Note that the second substrate 808 is in electrical contact with the first substrate 802 in order to transmit power supplied to the external connector 108 to the motors 302 and 304.

Figure 8B:
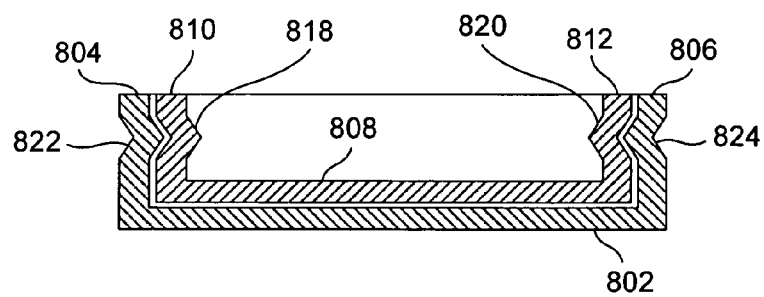

FIG. 8B illustrates a first cross-sectional view of the optical disc drive show in FIG. 8A. The indentations 818 and 820 of the slotted guides 810 and 812, respectively, accommodate the protuberances of indentations 822 and 824 of the slotted guides 804 and 806, respectively.

Figure 8C:
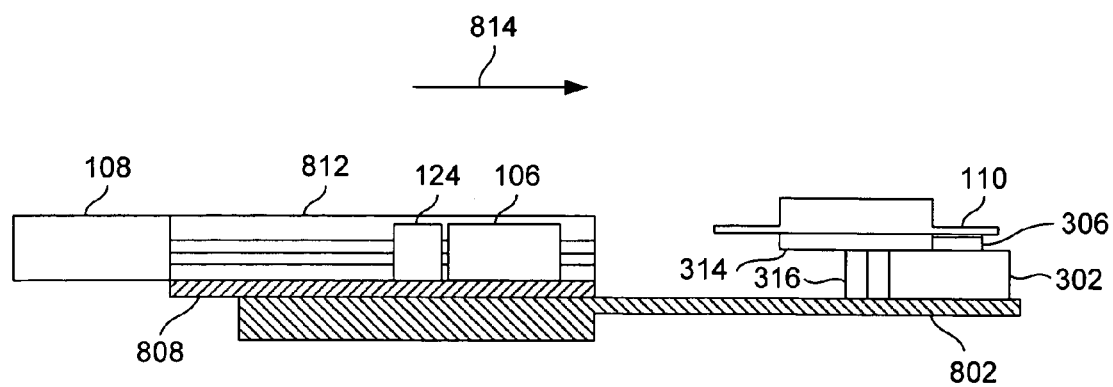

FIG. 8C illustrates a second cross-sectional view of the optical disc drive shown in FIG. 8A. The second substrate 808 is located on the top surface of the first substrate 802 so that the second substrate 808 slide over the top surface of the first substrate 802 in the direction identified by directional arrow 814 to give retracted optical disc drive 800, described below with reference to FIG. 8D.

Figure 8D:
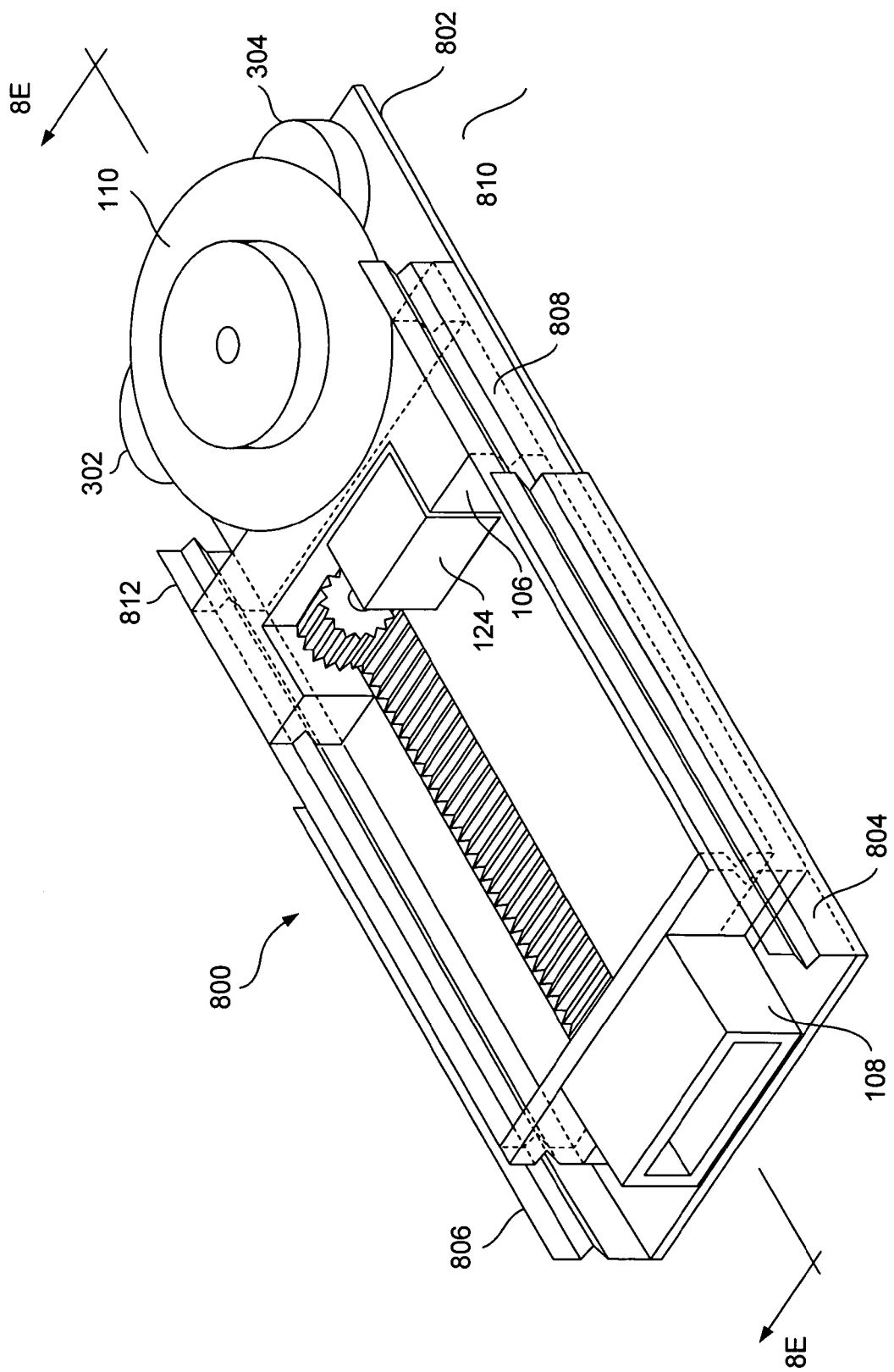

FIG. 8D illustrates a perspective view of the retracted optical disc drive shown in FIG. 8A. In FIG. 8D, the optical assembly 106 is located beneath the clamping mechanism 110, and the external connector 108 is located above the top surface of the first substrate 802 and between the slotted guides 804 and 806.

Figure 8E:
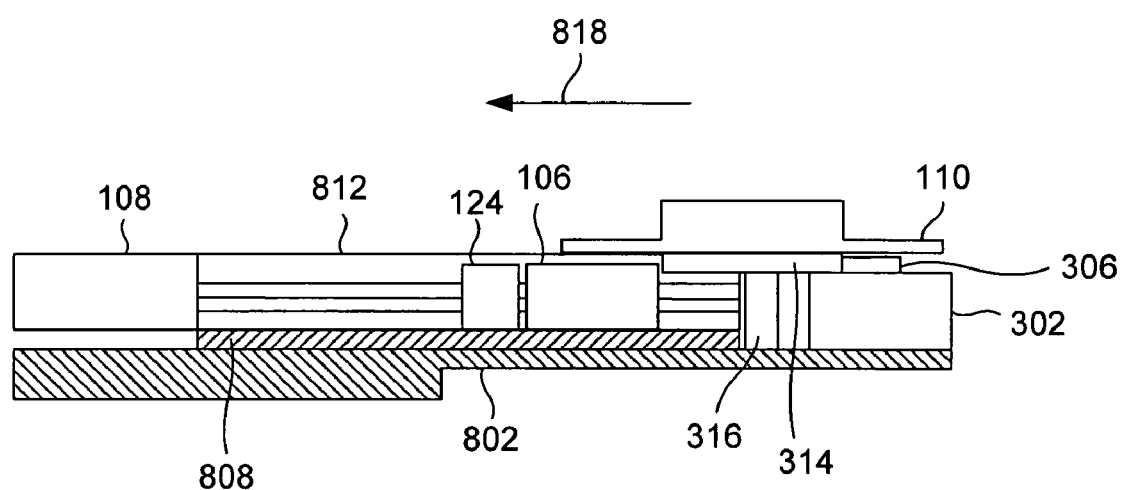

FIG. 8E illustrates a cross-sectional view of the retracted optical disc drive shown in FIG. 8A. In FIG. 8E, the space between the clamping mechanism 110 and the top surface of the substrate 802 accommodates the second substrate 808 and the optical assembly 106. The second substrate 808 can slide over the first substrate 802 in the direction identified by directional arrow 816 to give the expansion of optical disc drive 800 shown in FIG. 8A.

Figure 9A:
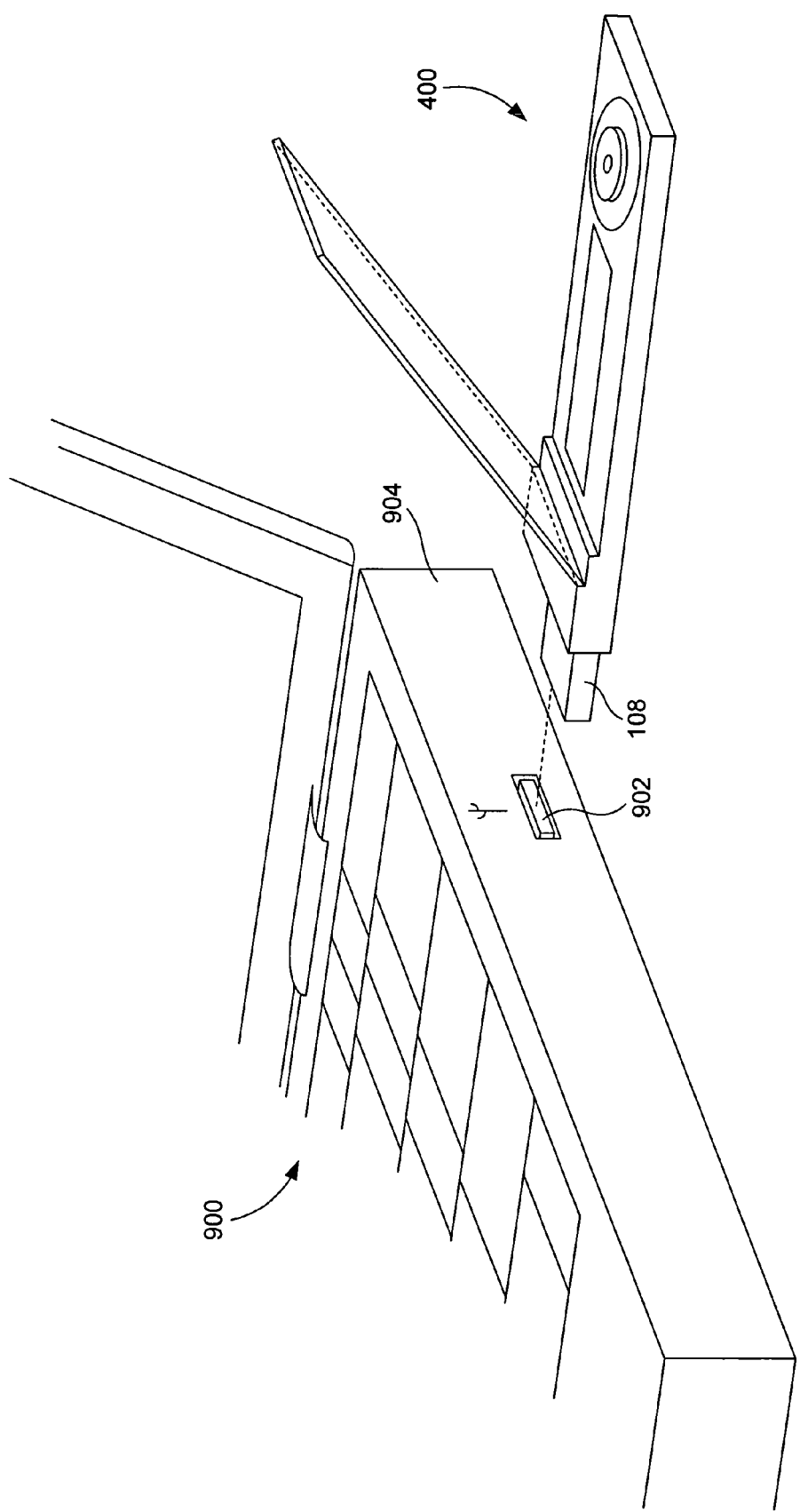
FIGS. 9A-9B illustrate an optical disc drive that plugs into a USB outlet of a notebook computer that represents an embodiment of the present invention.
Figure 9B:
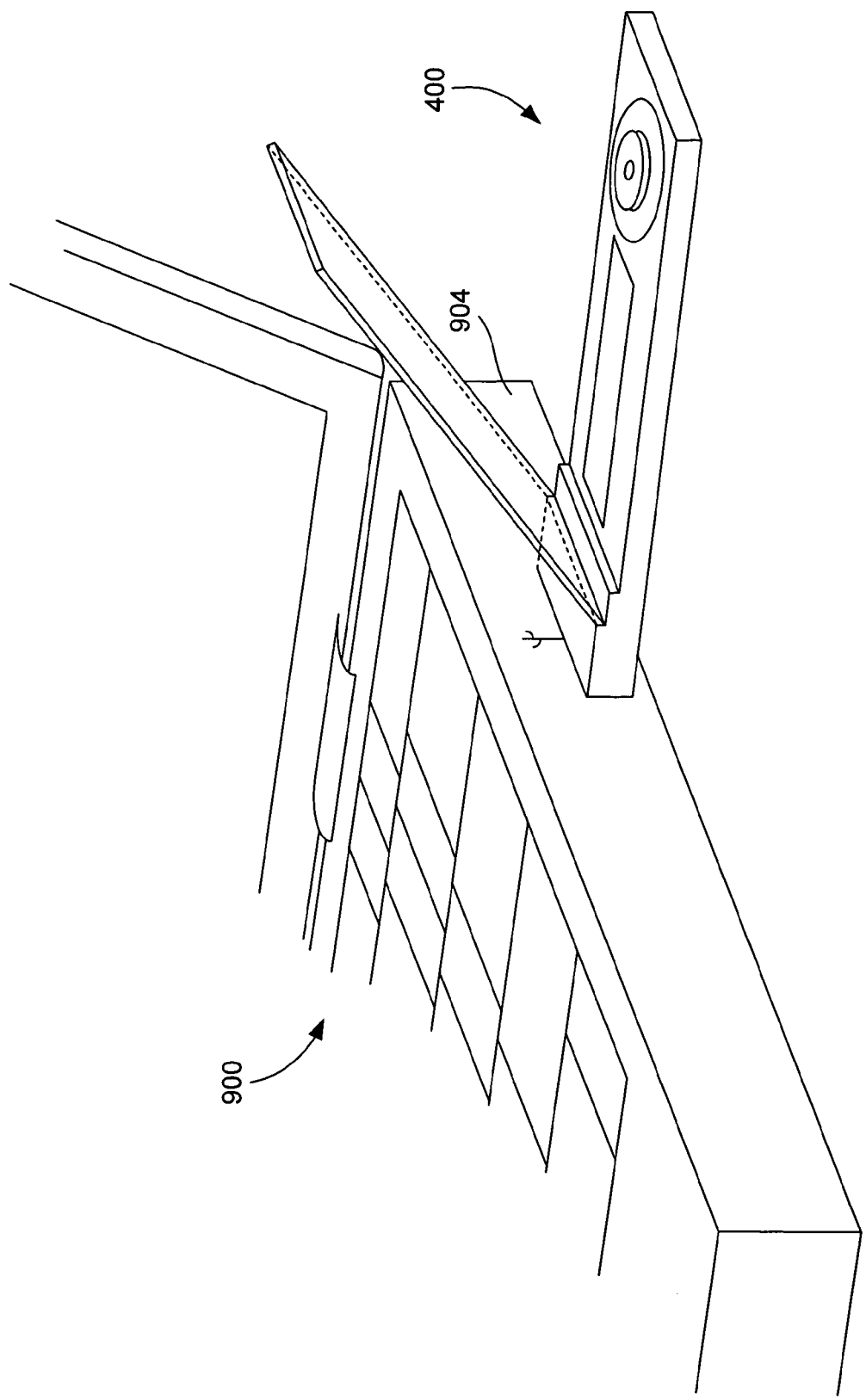

The external connector on the optical disc drive, described above with respect to FIGS. 1-8E, provides electrical connections between the substrate and an electrical device and plugs into an outlet of an electrical device so that the substrate extends beyond an external sidewall of the electrical device. FIGS. 9A-9B illustrate an optical disc drive that plugs into a USB outlet of a notebook computer that represents an embodiment of the present invention. In FIG. 9A, notebook computer 900 includes a USB outlet 902 for receiving the electrical connection 108 of the optical disc drive 400. When electrical connection 108 is inserted into USB outlet 902, the optical disc drive 400 extends beyond external sidewall 904 of the notebook computer 900, as shown in FIG. 9B.

Figure 10A:
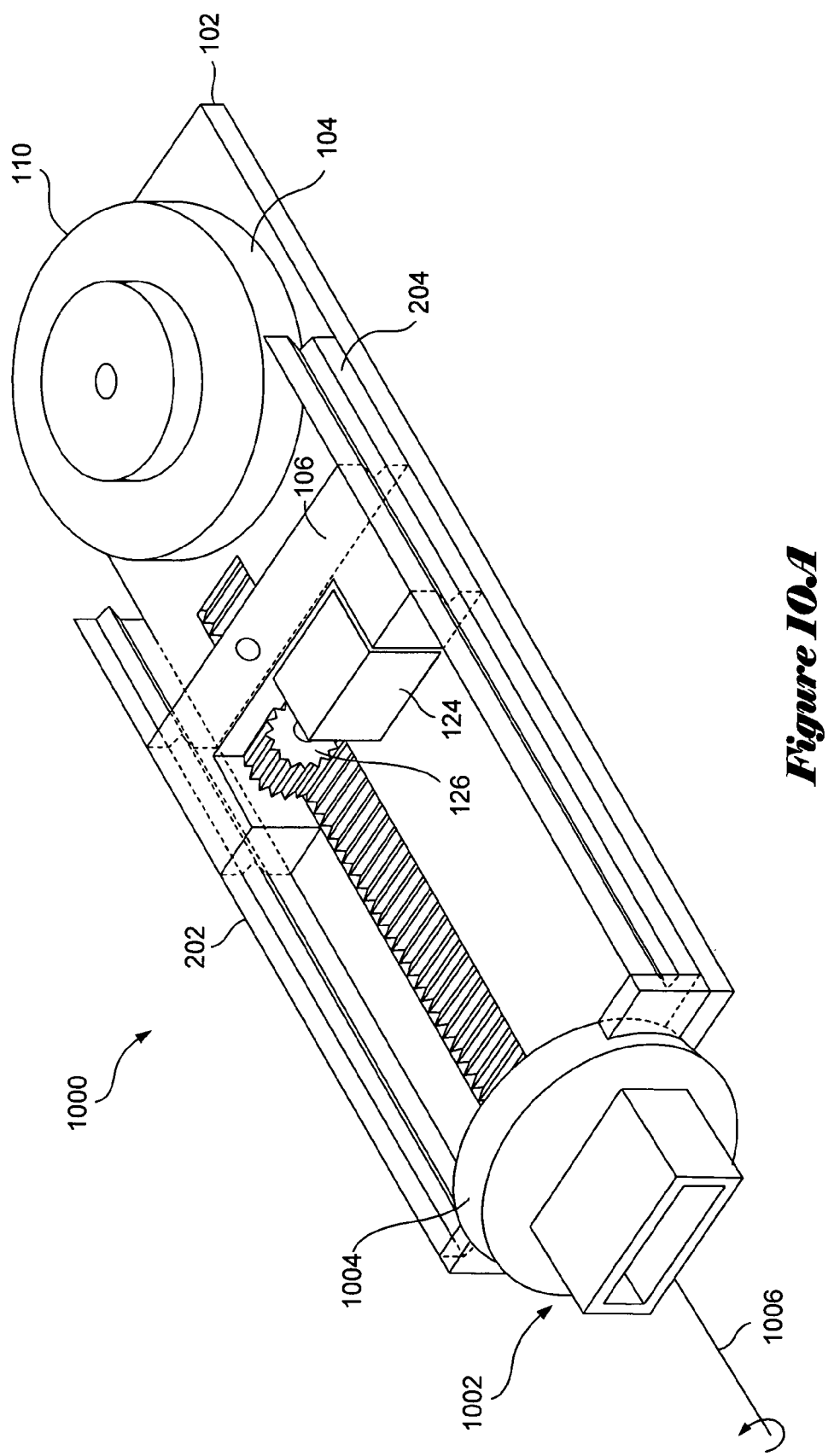

In alternate embodiments of the present invention, a portable optical disc drive may include an external connector with a rotatable interface so that the optical disc drive can be connected to electronic devices having external connectors with various orientations. For example, FIGS. 10A-10B illustrate an optical disc drive 900 that includes an external connector that can be rotated within a plane perpendicular to the substrate of the optical disc drive that represents one of many embodiments of the present invention. In FIG. 10A, external connector 1002 includes a rotatable interface 1004 that can be rotated 90 degrees about a central axis 1006 to give the rotated external connector 1002 shown in FIG. 10B. The substrate 102 and the interface 1004 can include electrical interconnections that interconnect the external connector 1002 with the electrical signal wires of the substrate 102 for the external connector 1002 located at an angle between 0 and 90 degrees. In an alternate embodiment of the present invention, the connector 1002 can be rotated to angles between −90 and 90 degrees with respect to the substrate 102 to allow connections to devices with connector orientations in either orientation. In alternate embodiments, the external connector can include a rotatable interface that allows the external connector to be rotated out of the plane of the optical disc drive or rotated within the plane of the optical disc drive Although the present invention has been described in terms of particular embodiments, it is not intended that the invention be limited to these embodiments. Modifications within the spirit of the invention will be apparent to those skilled in the art. For example, in alternate embodiments, the optical disc cover may include a curved outer edge that that protects the outer edge of a rotating disc attached to the clamping mechanism, or the optical disc cover may enclose the entire optical disc. In an alternate embodiment, the expandable optical disc drive may include a cover that protects the optical disc drive components during operation.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. An optical disc drive comprising:
    a substrate having a width smaller than the diameter of an optical disc;
    a clamping mechanism supported by the substrate for receiving the optical disc;
    one or more guides connected to the substrate;
    an optical assembly supported by the guides and being moveable along the guides in a radial direction of the optical disc; and
    an external connector that provides electrical connections between the substrate and an electrical device and is capable of plugging into an outlet of the electrical device so that the optical disc drive extends beyond an external sidewall of the electrical device.

2. The optical disc drive of claim 1 further comprising:
    one or more motors that rotate the clamping mechanism and optical disc together;
    a motor connected to the optical assembly that includes a gear with teeth; and
    a rack fixed to the substrate, the rack having teeth that interlock with the teeth of the gear so that the optical assembly can be moved along the guide surfaces in the radial direction of the optical disc as a result of rotation of the gear.

3. The optical disc drive of claim 2 wherein the substrate further comprises electrical interconnections that interconnect the motors that rotate the clamping mechanism, the optical assembly, and the external connector.

4. The optical disc drive of claim 2 wherein the rack is fixed to either the substrate or one or more of the gears.

5. The optical disc drive of claim 1 further comprising a cover and a flap that protects the optical assembly and substrate.

6. The optical disc drive of claim 1 wherein the guides are cylindrical guides connected to supports and the external connector.

7. The optical disc drive of claim 1 wherein the guides include slots that span the length of each guide.

8. The optical disc drive of claim 1 wherein the optical assembly further comprises one or more light sources, an optical lens, and a sensor for detecting light reflected from a data recording surface of the optical disc.

9. The optical disc drive of claim 1 further comprising an optical disc cover.

10. The optical disc drive of claim 9 wherein the optical disc cover further comprises a number of interlocking vanes.

11. The optical disc drive of claim 9 wherein the optical disc cover further comprises a single piece of material that can be folded and unfolded.

12. The optical disc drive of claim 1 wherein the external connector includes a rotatable interface with the substrate so that the external connector can be rotated.

13. An expandable optical disc drive comprising:
a first substrate and a second substrate, each having a width smaller than the diameter of an optical disc;
a clamping mechanism supported by the first substrate for receiving the optical disc;
one or more guides connected to the first substrate;
one or more guides connected to the second substrate, each being moveable along the guides of the first substrate so that the second substrate can slide over the first substrate;
an optical assembly being moveable along the guides of the second substrate in a radial direction of the optical disc; and
an external connector that is capable of plugging into an outlet of an electrical device so that the optical disc drive extends beyond an external sidewall of the electrical device and is electronically interconnected to the electrical device.

14. The optical disc drive of claim 13 further comprising:
one or more motors connected to the first substrate that rotate the clamping mechanism and optical disc together;
a motor connected to the optical assembly that includes a gear with teeth; and
a rack having teeth that interlock with the teeth of the gear so that the optical assembly can be moved along the guide of the second substrate in the radial direction of the optical disc.

15. The optical disc drive of claim 14 wherein the first and second substrates further comprise electrical interconnections that interconnect the motors that rotate the clamping mechanism, the optical assembly, and the external connector.

16. The optical disc drive of claim 14 wherein the rack is fixed to either the substrate or one or more of the gears.

17. The optical disc drive of claim 13 wherein the guides include slots that span the length of each guide.

18. The optical disc drive of claim 13 wherein the optical assembly further comprises one or more light sources, an optical lens, and a sensor for detecting light reflected from a data recording surface of the optical disc.

19. The optical disc drive of claim 13 further comprising an optical disc cover.

20. The optical disc drive of claim 19 wherein the optical disc cover further comprises a number of interlocking vanes.

21. The optical disc drive of claim 19 wherein the optical disc cover further comprises a single piece of material that can be folded and unfolded.

22. The optical disc drive of claim 13 wherein the external connector includes a rotatable interface with the substrate so that the external connector can be rotated.

23. An optical disc drive comprising:
a substrate having a width smaller than the diameter of an optical disc;
a clamping mechanism supported by the substrate for receiving the optical disc; and
an external connector that is capable of plugging into an outlet of an electrical device so that the optical disc drive extends beyond an external sidewall of the electrical device and is electronically interconnected to the electrical device.

24. The optical disc drive of claim 23 further comprising:
one or more motors that rotate the clamping mechanism and the optical disc together;
one or more guides connected to the substrate;
an optical assembly supported by the guides and being moveable along the guides in a radial direction of the optical disc;
a motor connected to the optical assembly that includes a gear with teeth; and
a rack fixed to the substrate, the rack having teeth that interlock with the teeth of the gear so that the optical assembly can be moved along the guide surfaces in the radial direction of the optical disc as a result of rotation of the gear.

25. The optical disc drive of claim 24 wherein the substrate further comprises electrical interconnections that interconnect the motors that rotate the clamping mechanism, the optical assembly, and the external connector.

26. The optical disc drive of claim 23 wherein the external connector includes a rotatable interface with the substrate so that the external connector can be rotated.

27. An optical disc drive comprising:
one or more substrates having a width smaller than the diameter of an optical disc and that covers and protects one or more data recording surfaces of the optical disc; and
an external connector that is capable of plugging into an outlet of an electrical device so that the optical disc drive extends beyond an external sidewall of the electrical device and is electronically interconnected to the electrical device.

28. The optical disc drive of claim 27 further comprising:
a clamping mechanism supported by the substrate for receiving the optical disc;
one or more motors that rotate the clamping mechanism and the optical disc together;
one or more guides connected to the substrate;
an optical assembly supported by the guides and being moveable along the guides in a radial direction of the optical disc;
a motor connected to the optical assembly that includes a gear with teeth; and
a rack fixed to the substrate, the rack having teeth that interlock with the teeth of the gear so that the optical assembly can be moved along the guide surfaces in the radial direction of the optical disc as a result of rotation of the gear.

29. The optical disc drive of claim 28 wherein the substrate further comprises electrical interconnections that interconnect the motors that rotate the clamping mechanism, the optical assembly, and the external connector.

30. The optical disc drive of claim 27 wherein the external connector includes a rotatable interface with the substrate so that the external connector can be rotated.

* * * * *